United States Patent [19]

DeLucca et al.

[11] Patent Number: 4,861,527
[45] Date of Patent: Aug. 29, 1989

[54] HIGH STRENGTH CHITOSAN FIBERS AND FABRICS THEREOF

[76] Inventors: George V. DeLucca, 1816 Gravers La., Wilmington, Del. 19810; Lorenzo F. Pelosi, 4900 Old Hill Rd., Wilmington, Del. 19807; John P. O'Brien, 353 Saginaw Rd., Oxford, Pa. 19363

[21] Appl. No.: 153,358

[22] Filed: Feb. 8, 1988

Related U.S. Application Data

[63] Continuation-in-part of Ser. No. 942,442, Dec. 16, 1986, Continuation-in-part of Ser. No. 90,144, Aug. 27, 1987, and a continuation-in-part of Ser. No. 90,145, Aug. 27, 1987.

[51] Int. Cl.⁴ .................. D01F 9/00; C08B 37/10; C07H 13/02
[52] U.S. Cl. ..................... 264/186; 536/20; 536/119; 527/305; 264/83
[58] Field of Search .................. 527/305; 536/20, 119; 264/83, 186

[56] References Cited

U.S. PATENT DOCUMENTS

| 3,892,731 | 7/1975 | Austin | 536/20 |
| 3,903,268 | 9/1975 | Balassa | 424/28 |
| 4,079,727 | 6/1977 | Austin et al. | 536/20 |
| 4,392,916 | 7/1983 | Nishiyama et al. | 162/158 |
| 4,401,807 | 8/1983 | Koshugi | 536/20 |
| 4,431,601 | 2/1984 | Kifune et al. | 536/20 |
| 4,699,135 | 10/1987 | Motosugi et al. | 128/156 |

FOREIGN PATENT DOCUMENTS 56-106901  8/1981  Japan.

Primary Examiner—John Kight
Assistant Examiner—Nathan M. Nutter

[57] ABSTRACT

High strength chitosan fibers from chitin and chitosan derivatives and the process for making these fibers are disclosed.

6 Claims, 2 Drawing Sheets

U.S. Patent  Aug. 29, 1989  Sheet 2 of 2  4,861,527

HIGH STRENGTH CHITOSAN FIBERS AND FABRICS THEREOF

RELATED APPLICATIONS

This application is a continuation-in-part of our applications Ser. No. 942,442, filed Dec. 16, 1986, and Ser. Nos. 090,144 and 090,145, filed Aug. 27, 1987.

Chitin (poly-N-acetyl-D-glucosamine) is a polysaccharide widely distributed in nature and is a major component of the cell wall of various fungi as well as the shell of insects and crustaceans. Chitin has been extracted and purified from its various sources and has been formed into potentially useful articles such as fibers for medical sutures.

High strength chitosan fibers are difficult to produce directly. A method for spinning chitosan into fiber is described in U.S. Pat. No. 4,699,135, issued Oct. 13, 1987. Chitosan fiber produced as described in said patent is relatively weak. It has now been discovered that by spinning an aniostropic solution of a derivative of chitin or chitosan through an inert gas into a coagulating bath and subsequently converting the fiber to a chitosan fiber via the action of alkali, a fiber of significantly higher tenacity can be obtained.

SUMMARY OF THE INVENTION

The invention provides a method for preparing high strength chitosan fiber comprising extruding an anisotropic solution of a chitin or chitosan derivative from a spinneret through an inert gas and into a coagulation bath and treating the resulting fiber with alkali to form chitosan fiber. Included in the invention is the resulting high strength chitosan fiber and the process wherein the as-spun fiber is formed into a fabric prior to treatment with alkali.

DETAILED DESCRIPTION OF THE INVENTION

Chitin acetate/formate and chitosan acetate/formate polymers are disclosed in copending and coassigned U.S. patent application Ser. No. 942,442 to DeLucca et al. Chitin acetate/formate and chitosan acetate/formate polymers can be spun into fibers having tenacities at least 4 g/den and moduli at least 100 g/den. all as disclosed in the aforementioned application. These tenacities can be reached directly for the as-spun fiber and are preferably at least 5.5 g/den for the chitin acetate/formate fiber and at least 6 g/den for the chitosan acetate/formate fiber. The moduli for chitin acetate/formate and for chitosan acetate/formate is preferably 150 g/den. The process for making chitosan acetate/formate polymer suitable for preparing fibers having as-spun tenacities greater than 4 g/den comprises the steps of adding formic acid, acetic anhydride and acetic acid to chitosan.

Chitin acetate fiber having a tenacity of at least 4 g/den, and a modulus of at least 100 g/den and a degree of acetylation of less than 2.2 is also described in the aforementioned application.

Purified chitin is derivatized to provide chitin acetate, chitin acetate/formate, and chitosan acetate/formate. These chitin derivatives can be extruded from optically anisotropic solutions through an inert gas, such as an air gap, and into a coagulating bath to form high strength fibers. Fibers made from the acetate/formate derivatives or low degree of substitution chitin acetate show increased strength when compared to non-derivatized chitin fibers or high degree of substitution chitin acetate.

Chitin, when isolated in high molecular weight form, is soluble at low concentration in only a limited number of specialized solvent systems. In order to enhance the solubility of chitin-based polymers, it is desirable to place organic substituents on the free amine or hydroxy groups of chitin or chitosan. These substituents perform two functions. First, they provide organic pendant groups to facilitate dissolution in organic solvent systems, e.g. trichloroacetic acid/methylene chloride. Second, the presence of such substituents disrupts the crystalline, strongly hydrogen-bonded structure of native chitin, which itself constitutes a significant barrier to dissolution. Mixed substituent derivatives such as acetate/formate are especially attractive in aiding the dissolution and spinning processes in that their fiber-forming ability and viscosity are very well suited for spinning at concentrations exceeding 10 wt. % and would therefore be attractive for commercial scale manufacture. In addition, it is observed that the loss of molecular weight as evidenced by a decrease in solution viscosity with time is greatly reduced with the mixed substituent derivatives.

Chitin refers to poly-N-acetyl-D-glucosamine wherein the degree of N-acetyl substitution is from 0.75–1.0. Though chitin is found naturally with the C5–C6 bond in the D-configuration, the chemistry defined herein would be just as applicable to an L-form and is not intended to be limited to the D-form.

Chitin derivatives are referred to herein in the following manner: chitin acetate refers to poly-N-acetyl-O-acetyl-D-glucosamine wherein the O-acetyl group can be substituted at the C3 and C6 position of the monomer to a varying degree, with a degree of O-acetylation ranging from about 0.05 to 2.0; chitin acetate/formate refers to poly-N-acetyl-O-acetyl-N-formyl-O-formyl-D-glucosamine wherein the O-acetyl and O-formyl substitution occurs at the C3 and C6 ring-position of the monomer in a random distribution within the polymer to a varying degree, with a degree of acetylation ranging from about 0.05 to 2.0 and a degree of formylation ranging from about 0 to 1.95 and wherein the N-acetyl substitution is a degree of acetylation ranging from about 0.75 to 1.0 wherein the N-formyl substitution is a degree of formylation ranging from about 0 to 0.25 and wherein the total degree of formylation is greater than 0.05. Chitosan is obtained by de-N-acetylation of chitin and refers to poly-D-glucosamine; and chitosan acetate/formate refers to poly-N-formyl-N-acetyl-O-acetyl-O formyl-D-glucosamine wherein the O-acetyl and O-formyl substitution occurs at the C3 and C6 position of the monomer in a random distribution within the polymer to a varying degree, with a degree of acetylation ranging from about 0 to 2.0, preferably b 0.05 to 2.0, and a degree of formylation ranging from about 0 to 2.0 and wherein the N-acetyl substitution is a degree of acetylation ranging from about 0 to 0.75, the N-formyl substitution is a degree of formylation ranging from about 0 to 1.0 and wherein the total degree of acetylation is greater than 0.05 and the total degree of formylation is greater than 0.05. The total degree of formyl and acetyl group substitution onto the above-described chitin derivatives is determined by the types and concentration of reactants and catalysts used for the preparation of each polymer.

In the preparation of fibers, optically anisotropic solutions of each chitin derivative were prepared and then extruded from a spinneret through an inert gas, such as air or nitrogen, into a coagulation bath to form fibers which were then wound onto bobbins.

The anisotropic spinning solutions were prepared by dissolving the chitin derivative into a solvent comprising trichloracetic acid/methylene chloride. The solutions were judged to be anisotropic if, when sandwiched between a microscope slide and cover slip, they were birefringent when viewed between crossed polarizers. Generally, chitin derivatives were found to form optically anisotropic solutions when dissolved at weight percents greater than 10% in a 60/40 (w/w) trichloroacetic acid/methylene chloride solvent.

It is recognized that both the molecular weight and pattern of substitution of chitin polymers or chitin derivative polymers will probably determine their solubility in any particular solvent and also the concentrations at which optical anisotropy is observed. Also, even though a 60/40 (w/w) trichloroacetic acid/methylene chloride solvent is used for most of the work described herein, other solvents for chitin or its derivatives could be used.

The chitin derivative chitosan acetate/formate can be formed by reacting chitosan in the presence of acetic acid, formic acid and acetic anhydride. The order of addition and relative quantities of these reactants is important in determining the product obtained.

When chitosan is dissolved first in an aqueous mixture of acetic and formic acids followed by the addition of acetic anhydride, predominantly N-formylation and O-formylation occur, accompanied by some O-acetyl substitution. Rather, if the chitosan is first dissolved in an aqueous solution of acetic acid and acetic anhydride followed by the addition of formic acid, a mixture of N-acetylation, O-acetylation, N-formylation and O-formylation is obtained.

The ratio of acetic acid to formic acid in the above solutions will determine the relative degree of substitution obtained. In addition, the predominant N-substituted species is determined by which corresponding acid (acetic or formic) is added first to the chitosan in the presence of acetic anhydride; the level of acetic anhydride being rate limiting.

The chitin derivative, chitin acetate/formate, is formed by reacting formic acid and acetic anhydride with chitin in the presence of an acid catalyst. Acetylation of chitin by acetic anhydride in the presence of an acid catalyst occurs rapidly. Therefore, to control the level of formylation occurring on the chitin, the formic acid can be added first to the chitin in the presence of an acid catalyst and allowing sufficient time for formylation to occur before the subsequent addition of acetic anhydride. An acid catalyst useful in these reactions is perchloric acid.

The coagulation bath used during fiber formation consisted of cold methanol, which is a non-solvent for chitin and its derivatives. The coagulation bath was between 20 and 30 inches in length. Any suitable non-solvent for chitin or its derivatives could be used in place of methanol for the purpose of coagulating the fiber spinning solution.

There are many parameters which can be varied in the spinning scheme and one could readily adjust spinneret orifice diameters, length of the inert gas gap between the spinneret and the coagulating bath, jet velocity, bath conditions, ratio of windup speeds to jet velocity, as well as other parameters in order to optimize various physical properties of the fibers of this invention.

The chitin derivative polymers produced according to the present invention are spun from anisotropic solution and form high strength fibers. Fibers prepared from chitosan acetate/formate have tensile properties which typically fall between 4–8 g/d tenacity and 150–250 g/d initial modulus. It is expected that articles other than fibers, such as cast or molded products, could be produced from the polymers described herein and may also demonstrate high strength properties.

High strength chitosan fibers are prepared by spinning an aniosotropic solution of a derivative of chitin or chitosan through an inert gas and into a coagulating bath, removing the as-spun fiber and treating it with alkali to remove N-acetyl, O-acetyl or other pendant groups at the 2, 3 and 6 carbon positions of the glucosamine repeating unit. Treatment of fibers is by immersion of the fibers into a solution of NaOH. With fine denier fibers, e.g., 4–5 dpf., a 5 minute immersion at 70° C. in a 50% wt. solution of NaOH is satisfactory. A 2–3 hr. exposure at 80° C. in a 30% wt. solution is useful with chitosan acetate formate fiber. With chitosan acetate, temperatures in the range of 80° to 116° C. at NaOH concentration of 30% have been found useful with the higher temperatures requiring less time for completion of the reaction. Severe treatments are generally to be avoided since they may cause excessive interfilament fusion and a product of inferior quality. Conversion of the starting fiber to a chitosan fiber is confirmed if the chitosan fiber is readily soluble in dilute (3–20% wt.) acetic acid.

DETAILED DESCRIPTION OF THE DRAWING

Figure 1:
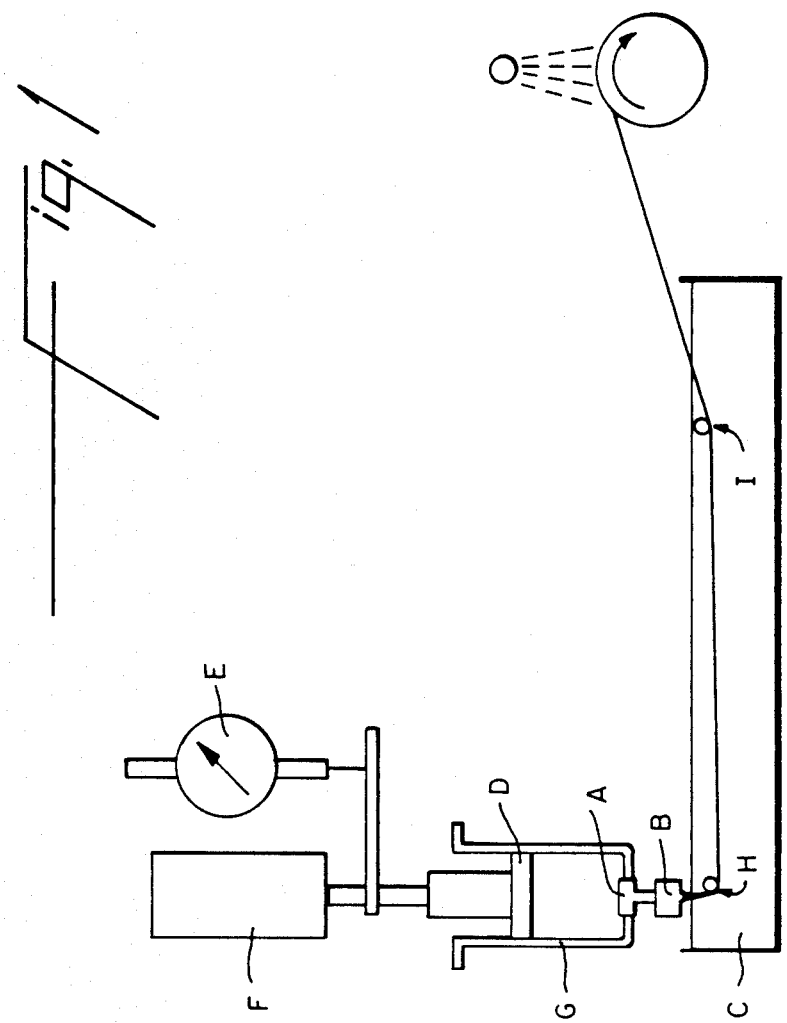
FIG. 1 is a schematic diagram of an apparatus for air-gap spinning of anisotropic solutions of chitin and chitin derivatives.

In using the apparatus of FIG. 1 an anisotropic solution of chitin or a chitin derivative was placed in spin cell (G). A piston (D) activated by hydraulic press (F) and associated with piston travel indicator (E) was positioned over the surface of the solution, excess air expelled from the top of the cell and the cell sealed. The spin cell was fitted at the bottom with the following screens (A) for solution filtration: four to six 325-mesh screens. The filtered solution was then passed into a spinneret pack (B) containing two or three 325-mesh screens. Solutions were extruded through an air gap at a controlled rate into a static bath (C) using a metering pump to supply pressure at piston (D). The fiber was passed around a pin (H), pulled through the bath, passed under a second pin (I) and wound onto a bobbin. The air gap between the spinneret face and the coagulation bath was typically 0.6 to 2.0 cm. The coagulation bath temperature was generally held below 100° C. with specific values as given in the examples.

Figure 2:
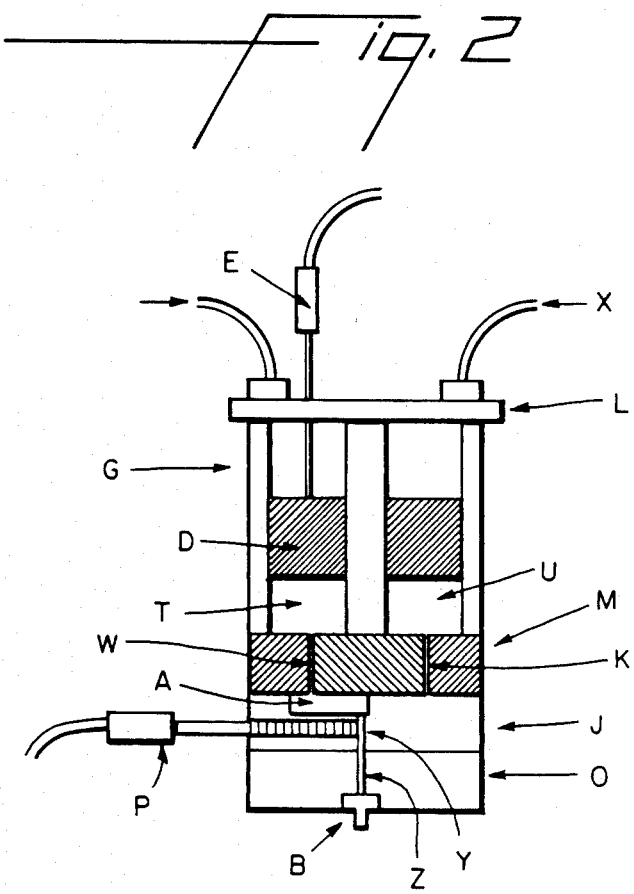
FIG. 2 is a schematic diagram of a twin cell apparatus for air-gap spinning of anisotropic solutions of chitin and chitosan derivatives.
Figure 3:
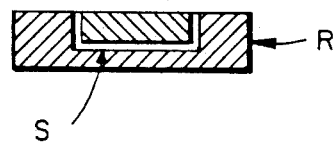
FIG. 3 is a schematic diagram of a mixing plate used in conjunction with the apparatus of FIG. 2.

In using the apparatus of FIG. 2, filter plate (J) is replaced by mixing plate (R). Polymer dope is placed in cylinder bore (T) and then piston (D) and cap plate (L) is fitted to the spin cell (G). A driver fluid (e.g. water)

is pumped into the upper part of bore (T) through feed line (F). The piston (D) is displaced by the driver fluid, thereby pushing the polymer dope through passages (W), (S) in mixing plate (R) and then through passage (K) in distribution plate (M) into second cylinder bore (U). This process is then reversed by pumping fluid through feed line (X). The aforementioned forward and reverse process is repeated several times to effect a mixing of the polymer dope. Component (E) acts to sense the position of cylinder (D).

After mixing is complete (about 30 cycles), mixing plate (R) is replaced by filter plate (J) and polymer dope is extruded from bore (T) through passage (W), through filter pack (A) containing 2 Dutch Twill Weave 165×800 mesh screens, through passage (Y) in filter plate (J) and passage (Z) in spinneret mounting plate (O) and out of spin cell (G) through spinneret (B). The extruded dope is spun into a bath and taken up as described for FIG. 1. Pressure of the polymer dope during spinning is measured by pressure transducer (P).

TEST METHODS

Inherent viscosity (I.V.) is calculated using the formula:

Inherent viscosity $\eta_{inh} = (\ln \eta_{rel})/C$ where C is the polymer concentration in grams of polymer per deciliter of solvent. The relative viscosity ($\eta_{rel}$) is determined by measuring the flow time in seconds using a standard viscometer of a solution of 0.5 g (except where indicated) of the polymer in 100 ml hexafluoroisopropanol at 30° C. and dividing by the flow time in seconds for the pure solvent. The units of inherent viscosity are dl/g.

Jet Velocity (J.V.) is the average exit velocity of the spinning solution from the spinneret capillary as calculated from the volume of solution passing through an orifice per unit time and from the cross-sectional area of the orifice and is reported as meters per minute.

Filament tensile properties were measured using a recording stress-strain analyzer at 70° F. (21.1° C.) and 65% relative humidity. Gauge length was 1.0 in (2.54 cm), and rate of elongation was 10%/min. Results are reported as T/E/M. Tenacity T is break tenacity in g/den, Elongation (E) is elongation-at-break expressed as the percentage by which initial length increased, and Modulus (M) is initial tensile modulus in g/den. Average tensile properties for at least three filament samples are reported. The test is further described in ASTM D2101-79 part 33, 1981.

Degree of Substitution (DS) of acetate or formate is determined by proton-NMR in the following manner:

The spectra are determined in deuterated trifluoroacetic acid solvent and using tetramethylsilane (TMS) as a standard. The D.S. is determined by integrating the area due to the protons on carbons $C_1$ through $C_6$ of the glucosamine derivative (6.0 to 3.0 ppm) and comparing it with the total area due to the methyl group protons (2.5 to 2.0 ppm) using the following formula:

$$D.S. = (M/(G/7))/3$$

where:
M = area of methyl group protons
G = area of the protons on carbons $C_1$ through $C_6$ of the glucosamine derivative The formyl protons are observed at about 8.4 ppm for the amide and at about 8.2 ppm for the ester. The D.S. of formyl groups is determined in a similar fashion using the following formula:

$$D.S. = F/(G/7)$$

where:
F = area of formyl protons
G = area of the protons on carbons $C_1$ through $C_6$ of the glucosamine derivative
To determine the relative amounts of acetyl and formyl content in the mixed derivatives both formulas are used.

EXAMPLES

RUN A

Chitin was isolated from shrimp shells and spun into filter according to the following procedures:

Isolation of Chitin

Shrimp shells obtained from Gulf Cities Fisheries of Pascagoula, Miss. were placed in large containers and soaked in acetone for 5 to 7 days, after which the acetone was filtered off and the shells rinsed with additional acetone to remove as much pigment as possible. The shells were then air dried for 72 hours. The dried shells were ground into a flake using an Abbe cutter. The ground shells (500 g) were decalcified by treatment with ice cold 10% hydrochloric acid (4 to 6 l) with stirring for 20 minutes. The liquid was then removed by filtering and the shells rinsed with water. This acid treatment was repeated and the decalcified shells were rinsed with water until neutral and allowed to air dry. The dry solid was suspended in 2.5 l of 3% sodium hydroxide in a 5 l flask and heated at 100° C. for 2 hours. The suspension was then filtered and the remaining solid washed with water. This caustic treatment was repeated and the chitin obtained was washed with water until neutral. The chitin was then washed successively with methanol and acetone, air dried and lastly dried in a vacuum oven for about 12 hours at 120° C.

Spinning

Chitin obtained by the above procedure was dissolved at 24° C. in a 60/40 (w/w) trichloroacetic acid/methylene chloride mixture, to form a solution containing 13.5% solids. The solution was tested and found to be anisotropic.

The chitin solution above was extruded into fibers using the apparatus represented by FIG. 1 and described previously. The solution was extruded through 0.004" diameter holes of a 10-hole spinneret at a jet velocity of 15.2M/min., passed through a 1.25 cm air gap, into a 0° C. methanol bath and wound onto bobbins at a rate of 15.5M/min.

Fiber properties were measured as described above and are reported in Table I.

RUN B

Chitin acetate with a high degree of substitution of acetyl groups was synthesized and spun into fiber by the following method:

Preparation of Chitin Acetate 200 ml of reagent grade methylene chloride, 400 ml of reagent grade acetic anhydride, and 125 ml of glacial acetic acid were added to a 1 l resin kettle equipped with a stirrer and nitrogen inlet. The mixture was cooled to about 0° C. in a methanol bath and 20 g of chitin, prepared as in Run A, were added. 6 ml of 70% perchloric acid were then added slowly and the mixture was stirred about 12 hours. After stirring, the mixture was filtered on a fritted Buchner funnel and excess acetic anhydride was removed by aspiration. The solid was washed thoroughly with methanol, acetone, 10% sodium bicarbonate, water, and lastly acetone, after which the solvent was removed by aspiration. The remaining solid was then air dried for about 12 hours to give 25 g of chitin acetate as a white solid. The inherent viscosity of the polymer was 5.72 dl/g and the degree of substitution was 2.95.

Spinning

Chitin acetate prepared by the above procedure was spun as in Run A using the apparatus represented by FIG. 2 with the different spinning parameters listed in Table 2.

Fiber properties were measured as described above and reported in Table I.

EXAMPLE 1

Chitin acetate with a relatively low degree of substitution of acetyl groups on chitin was synthesized and spun into fiber by the following method:

Preparation of Chitin Acetate 200 ml of reagent grade methylene chloride, 400 ml of reagent grade acetic anhydride, and 125 ml of glacial acetic acid were added to a 1 l resin kettle equipped with a stirrer and nitrogen inlet. The mixture was cooled to about 0° C. in a methanol bath and 20 g of chitin, prepared as in RUN A, were added. 3 ml of 70% perchloric acid were then added slowly and the mixture was stirred about 12 hours. After stirring, the mixture was filtered on a fritted Buchner funnel and excess acetic anhydride was removed by aspiration. The solid was washed thoroughly with methanol, acetone, 10% sodium bicarbonate, water, and lastly acetone, after which all of the solvent was removed by aspiration for about 12 hours to give 25 g of chitin acetate as a white solid. The inherent viscosity of the polymer was 8.76 and the degree of substitution was 2.0.

Spinning

Chitin acetate prepared by the above procedure was spun as in Run A using the apparatus represented by FIG. 2 with the different spinning parameters listed in Table 2.

Fiber properties were measured as described above and reported in Table I.

EXAMPLE 2

Isolation of Chitin

Wet shrimp shell waste (25 kg) was sorted manually to remove extraneous substances and boiled in water for 2 hours. The shells were collected by vacuum filtration and placed into cheesecloth pouches. Using one-half of the batch at a time, the shells were then boiled in 2% NaOH (50 l) under a nitrogen atmosphere for 1 hour, collected, pressed out and washed once with water. The shells were then boiled for 9 hours in 2% NaOH (50 l) under nitrogen for a second time, collected, pressed out, washed in water and immersed in 50 l 10% acetic acid for 1 hour at room temperature. The shells were collected by filtration, washed twice more in water and pressed out. They were finally suspended in acetone (4 l), collected by filtration, washed once more with clean acetone and allowed to air dry. The yield was 1.2 kg dry chitin.

Preparation of Chitin Acetate

Chitin (50 g) prepared as described above was ground in two steps to pass through a 0.5 mm screen. The ground chitin was placed in a Soxhlet extractor and extracted with acetone until the extract was clear. After air drying, the chitin powder was washed twice with methanol, pressed out and heated to 77° C. in 15% methanolic potassium hydroxide for 1 hour under nitrogen. The powder was collected by filtration, pressed out, washed once with water followed by two washes in glacial acetic acid. After the final wash, the powder was pressed out and suspended using methods described above in cooled acetic anhydride (500 ml) and methylene chloride (500 ml) containing perchloric acid (2 ml) all at −22° C. After 16 hours, the temperature was raised to 13° C. and the reactants allowed to stir for an additional 24 hours reaching a final temperature of 18° C. The polymer was collected by filtration, pressed out and washed twice with methyl alcohol. The product was then washed once in 5% sodium bicarbonate, followed by two washes in water and a final wash in acetone. The product was dried in a vacuum at 55° C. The yield was 57 g. D.S.=1.4 based on NMR analysis.

Spinning

Chitin acetate prepared as described above was spun using the method of Run A and the equipment described by FIG. 1. The spinning solvent was 60/40 w/w trichloroacetic acid/methylene chloride. Pertinent spinning parameters appear in Table II.

Fiber properties were measured as described above and appear in Table I.

EXAMPLE 3

Chitin acetate/formate was prepared from chitin and then spun into fiber by the following method:

Preparation of Chitin Acetate/Formate 200 ml of reagent grade methylene chloride and 255 ml of formic acid (95-98%) were added to a 1 l resin kettle equipped with a stirrer and nitrogen inlet and cooled in a refrigerated bath to 0° C. 280 ml of acetic anhydride were added to the bath, allowed to cool to 0° C., and then 20 g of chitin prepared as in Run A were added, followed by the slow addition of 6 ml of 70% perchloric acid. The mixture was stirred for about 12 hours at 0° C. The suspension was washed thoroughly with methanol, acetone, 10% sodium bicarbonate, water, and lastly acetone. After removing the solvent by aspiration, the solid was aid dried for about 12 hours and yielded 24 g of chitin acetate/formate as a white solid.

The inherent viscosity of the polymer was 11.4 dl/g and the degree of substitution was 2.5/0.5 (acetyl/formyl).

Spinning

Chitin acetate/formate prepared by the above procedure was spun the same as in Run A using the apparatus represented by FIG. 2 with the different spinning parameters listed in Table II.

Fiber properties were measured as described above and reported in Table I.

EXAMPLE 4

Chitosan acetate/formate was prepared from chitosan which itself was prepared from chitin and then the chitosan acetate/formate was spun into fibers, per the following procedures:

Preparation of Chitosan

Shrimp shells were washed in acetone and ground into a flake as described in Run A. The washed and cut shells (310 g) were then treated with ice cold 9% hydrochloric acid (2 l water, 1 l ice chips, 1 l 37% HCl) in a large container for 20 minutes. The solution was filtered and the remaining solid rinsed with water. This acid treatment was repeated, after which the solid was washed with water until neutral and then washed with acetone and finally air dried. The resulting solid was treated with 2 l of 50% sodium hydroxide at 100° C. for 2 hours. The suspension was filtered and the remaining solid was rinsed with water. This caustic treatment was repeated a second time and the solid was collected by filtration, washed until neutral with water, and then washed with methanol and acetone and allowed to air dry. This procedure yielded 86 g of chitosan as a white solid.

The inherent viscosity of the chitosan was 11.3 dl/g in 50% aqueous acetic acid.

Preparation of Chitosan Acetate/Formate 750 ml of 95-98% formic acid and 40 g of chitosan prepared above were added in a 4 l resin kettle. The mixture was stirred under nitrogen in a refrigerated bath at 0° C. for 1.5 hours until all the polymer was dissolved.

250 ml of glacial acetic acid were then added and the mixture stirred until a homogeneous solution was obtained. The mixture was stirred an additional 30 min., 500 ml of reagent grade acetic anhydride were added and then the mixture was stirred for about 12 hours at 0° C. The resulting gel was broken up and soaked in methanol (6 liters) for a few hours to precipitate the polymer. The polymer was filtered and the solid gel chopped in a blender. The precipitated polymer was washed thoroughly with methanol several times, and then with acetone. The solid was aspirated to remove excess solvent and then allowed to air dry overnight. The yield was 53 g of chitosan acetate/formate as a while solid.

The inherent viscosity of the polymer was 10.8 dl/g and the degree of substitution was 0.4/2.3 (acetyl/formyl).

Spinning

Chitosan acetate/formate prepared by the above procedure was spun as in Run A using the apparatus represented by FIG. 2 with the different spinning parameters listed in Table II.

Fiber properties were measured as described above and reported in Table I.

EXAMPLE 5

Chitosan acetate/formate was prepared according to the general procedure in Example 4 with the changes noted below.

750 g of 95-98% formic acid and 40 g of chitosan were mixed in a 1 resin kettle at 0° C. Once the chitosan was well dispersed 500 ml of acetic anhydride were added and the reaction allowed to stir for 95 hours at 0° C. At that time the polymer was essentially completely in solution and was isolated by precipitation into cold methyl alcohol (6 liters at 0° C.). The white product was collected by vacuum filtration, then washed twice with water, followed by another wash in methyl alcohol and a final wash in acetone. The product was allowed to air dry yielding a white fibrous solid.

spinning

Chitosan acetate/formate prepared by the above procedure was spun using the mthod of Example 1 and the equipment described by FIG. 1. The spinning solvent was 49:51 w/w trichloroacetic acid/methylene chloride. Other pertinent spinning parameters appear in Table II.

Fiber properties were measured as described above and appear in Table I.

TABLE I

| | | FIBER PROPERTIES | | |
|---|---|---|---|---|
| EX. | DESCRIPTION | D.S. ACETATE/ FORMATE | DPF | TENSILE PROPERTIES TEN./ELONG./MOD. |
| A | Chitin | 1.0/0.0 | 15.7 | 1.3 gpd/2.6%/107 gpd |
| B | Chitin Acetate | 2.9/0.0 | 7.0 | 2.5 gpd/7.3%/90 gpd |
| 1 | Chitin Acetate | 2.0/0.0 | 4.5 | 4.3 gpd/4.5%/169 gpd |
| 2 | Chitin Acetate | 1.4 | 5.4 | 5.9 gpd/6.4%/206 gpd |
| 3 | Chitin Acetate/ Formate | 2.0/0.3 | 5.1 | 5.9 gpd/6.8%/162 gpd |
| 4 | Chitosan Acetate/ Formate | 0.4/1.4 | 19.1 | 7.0 gpd/6.8%/194 gpd |
| 5 | Chitosan Acetate/ Formate | 0.3/1.5 | 21.4 | 6.2 gpd/5.8%/185 gpd |

D.S. = degree of substitution, these fiber values can differ from those of the starting polymer because some partial deesterification may occur during conversion to fibers
DPF = denier per filament
Ex. = Example or run designation

TABLE II

| | SPINNING PARAMETERS | | | | | | |
|---|---|---|---|---|---|---|---|
| Parameters | Run A | Run B | Ex. 1 | Ex. 2 | Ex. 3 | Ex. 4 | Ex. 5 |
| % Solids | 13.5% | 15% | 15% | 15% | 15% | 17% | 15% |
| Spinneret | | | | | | | |
| No. of Holes | 10 | 1 | 1 | 5 | 1 | 1 | 20 |
| Dia. of Holes (cm) | 0.0102 | 0.0076 | 0.0076 | 0.0076 | 0.0076 | 0.0127 | 0.0076 |
| Jet Velocity (M/min) | 15.2 | 29.9 | 16.6 | 1.5 | 20.0 | 12.0 | 3.4 |
| Air Gap (cm) | 1.25 | 1.4 | 1.1 | 1.3 | 1.4 | 1.0 | 1.9 |
| Coagulation Bath Temp. (°C.) | 0 | 1 | 8 | 16 | −20 | 5 | −11 |
| Wind-up Rate (M/min) | 15.5 | 24 | 40 | 21.3 | 17 | 9.9 | 6.8 |

EXAMPLE 6

Chitosan acetate was prepared from commercial chitosan (Polysciences, Inc., Warrington, Pa.) by adding 6 l of ice-cold acetic anhydride to an ice-cold solution of 470 g chitosan in 11 l glacial acetic acid plus 2 l water and allowing the reaction mixture to stand overnight. The gelled product was chopped in water in a blender, washed with water until free of acetic acid, washed with acetone to remove mater, and air dried. In place of the water, one can use methanol.

A liquid crystalline solution of 17% wt. chitosan acetate in 60/40 wt/wt trichloracetic acid/methylene chloride was spun into uniform fibers using the methods described in previous examples. The fibers were soaked overnight in two changes of methanol and were air dried.

For regeneration to chitosan, the chitosan acetate fibers in the form of a 100-filament yarn were wound on a metal bar coated with fluorocarbon resin and were immersed for two hours in a 30% wt. sodium hydroxide solution refluxing at 116° C. under nitrogen. The fibers were then washed with water until free of caustic, washed with acetone to remove water, and air dried.

The resulting fibers were insoluble in acetone and glacial acetic acid but were readily soluble in 5% wt. acetic acid. The infrared spectrum of the fibers was essentially identical to that of commercial chitosan. Fiber tenacity averaged 3.5 g/d.

Suitable results can also be expected where chitosan formate acetate is employed in place of the chitosan acetate but methanol is then used for the washing step.

We claim:

1. A method for preparing high strength chitosan fibers comprising spinning an anisotropic solution of a derivtive of chitin or of chitosan through an inert gas and into a coagulating bath, removing as-spun fiber and treating it with alkali to remove acetyl, formyl or other pendant groups at the 2, 3 and 6 carbon positions of the glucosamine repeating unit to form chitosan.

2. The process of claim 1 wherein the as-spun fiber is formed into a fabric prior to conversion to chitosan by treatment with alkali.

3. The process of claim 1 wherein the as-spun fiber is treated by immersion in about a 50 to 70 wt. % solution of NaOH.

4. Chitosan fiber produced by the process of claim 1.

5. A method according to claim 1 wherein an anisotropic solution of chitosan acetate is spun.

6. A method according to claim 1 wherein an anisotropic solution of chitosan formate acetate is spun.

* * * * *